C. F. DE SORIA & J. F. CORRIGAN.
STAGE SETTING.
APPLICATION FILED MAY 25, 1908.
915,631.
Patented Mar. 16, 1909.
4 SHEETS—SHEET 1.
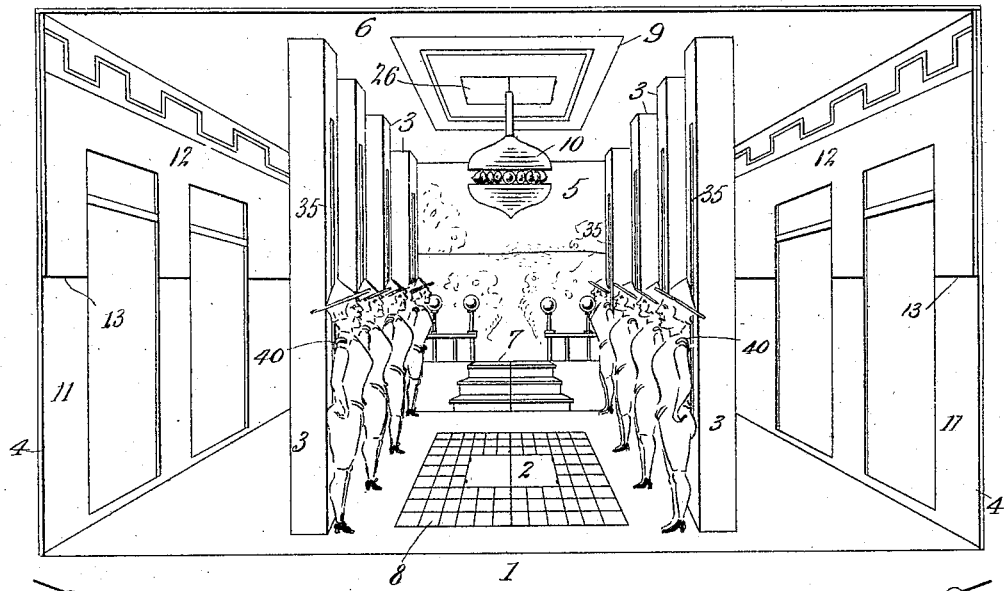
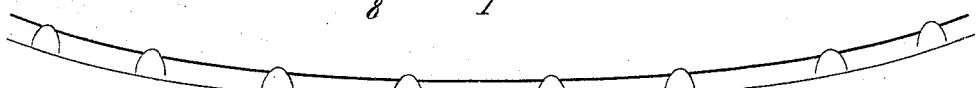
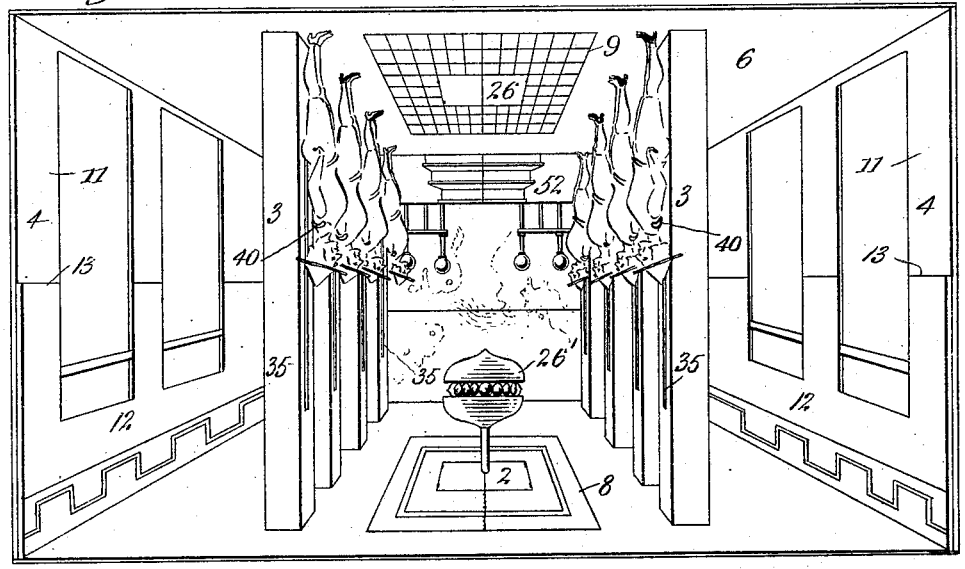

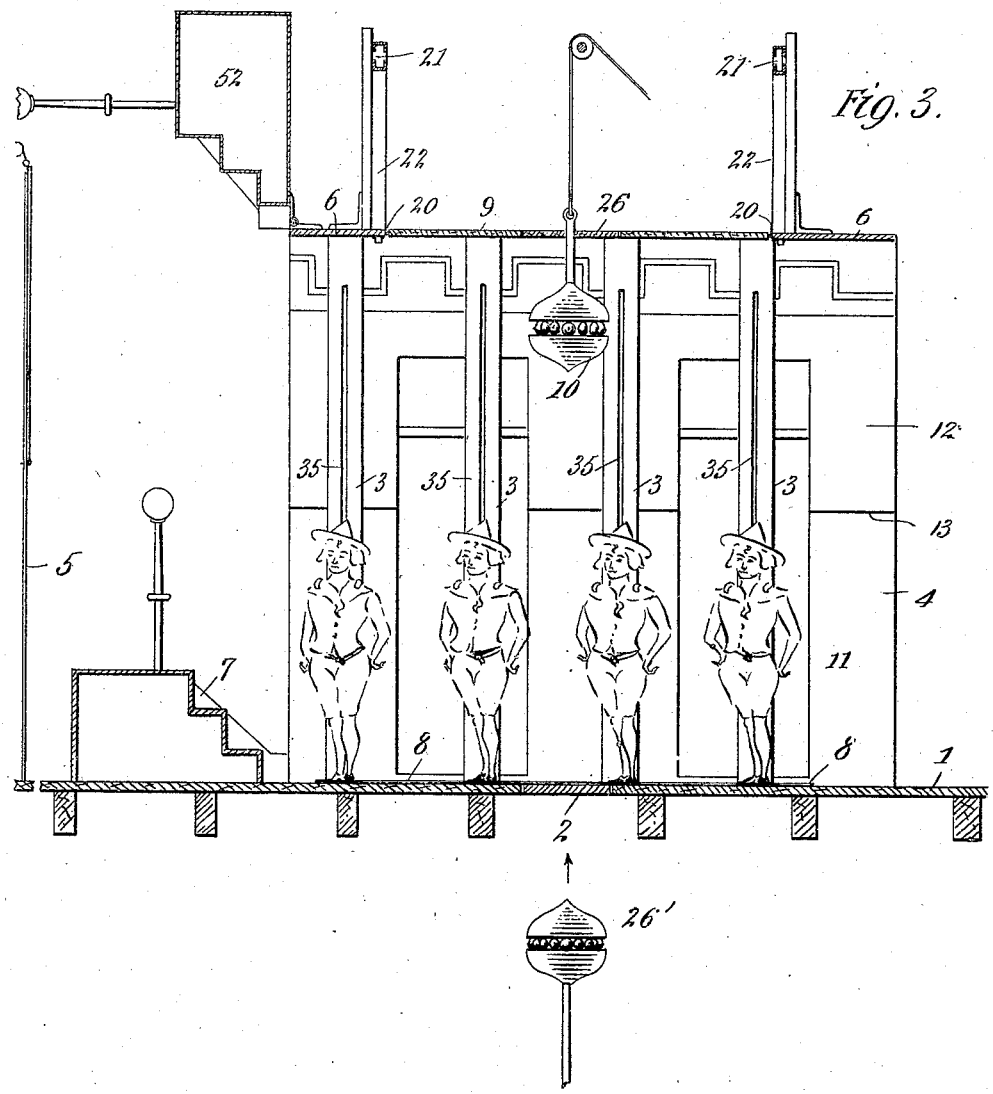
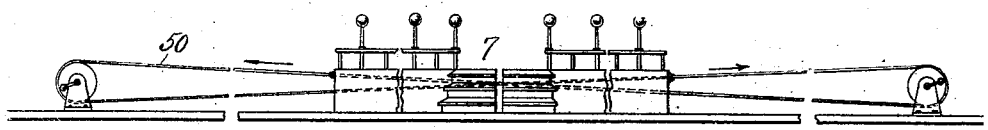

C. F. DE SORIA & J. F. CORRIGAN.
STAGE SETTING.
APPLICATION FILED MAY 25, 1908.
915,631.
Patented Mar. 16, 1909.
4 SHEETS—SHEET 3.
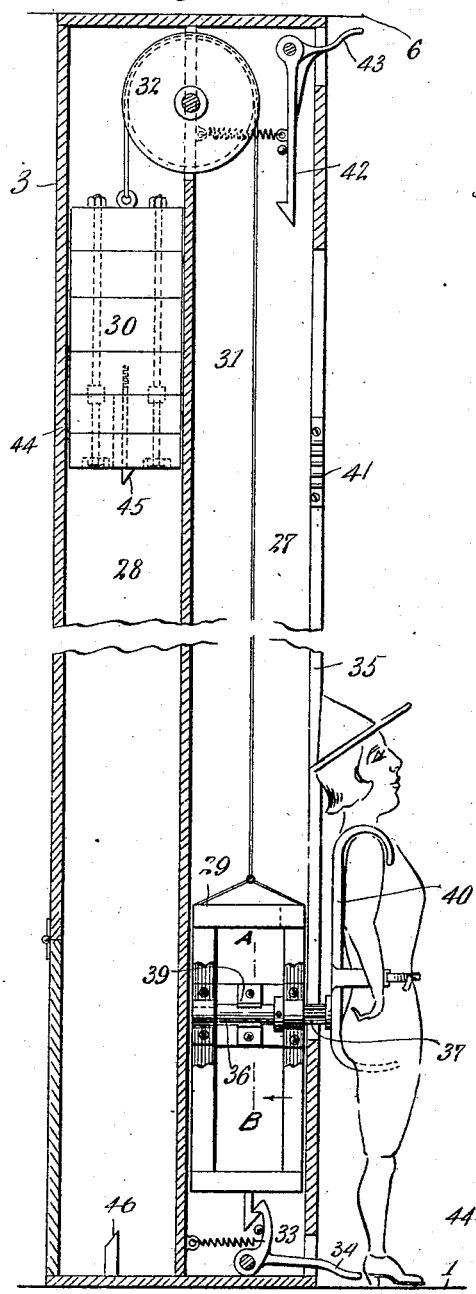
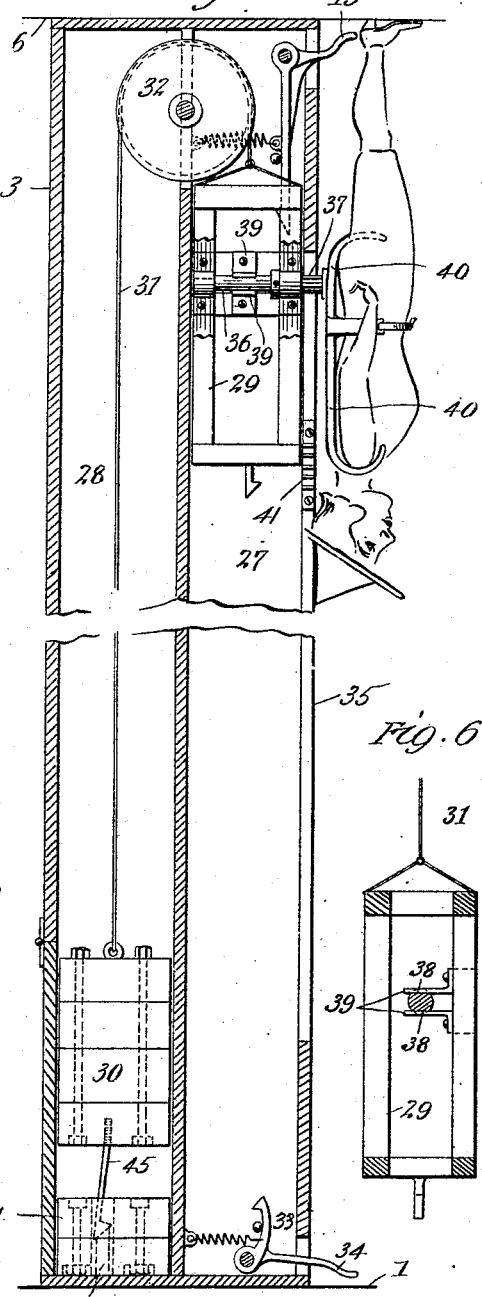
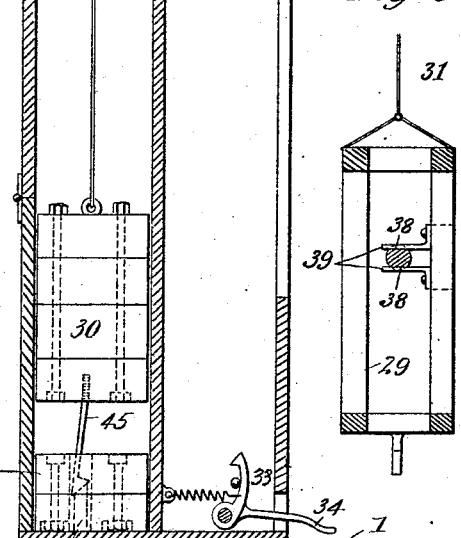
Witnesses:
Albert C. Leitch
James D'Antonio
Inventors
CHARLES F. de SORIA AND
JOHN F. CORRIGAN,
By their Attorney
Francis D. Ober

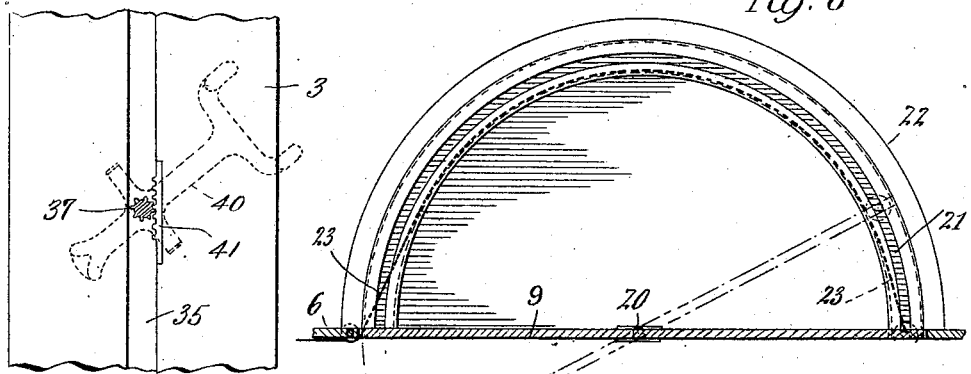

UNITED STATES PATENT OFFICE.

CHARLES F. DE SORIA, OF NEW YORK, AND JOHN F. CORRIGAN, OF MAMARONECK, NEW YORK.

STAGE-SETTING.

No. 915,631.  Specification of Letters Patent.  Patented March 16, 1909.

Application filed May 25, 1908. Serial No. 434,739.

*To all whom it may concern:*

Be it known that we, CHARLES F. DE SORIA and JOHN F. CORRIGAN, citizens of the United States, and residents, respectively, of New York, in the county of New York and State of New York, and Mamaroneck, in the county of Westchester and State of New York, have invented certain new and useful Improvements in Stage-Settings, of which the following is a specification.

Our invention relates to stage settings or scenes, the particular object being to provide an illusion by which a complete scene, including all the performers and everything else which can be observed by the audience, appears to become suddenly inverted or turned upside down, during a momentary interval while the lights are dimmed. With this object in view we provide scenery and means of a character adapted to suddenly change its appearance and appear to be turned upside down, without in most cases actually changing its position at all. In addition to this there is provided mechanism whereby the performers are lifted up and supported head downward against an upper surface or ceiling which is made to change its appearance at this time to represent a floor.

With these and other objects in view the invention consists in the features of construction and combination as hereinafter set forth and shown and finally particularly pointed out in the appended claims.

In the drawings: Figure 1 is a view of a characteristic scene embodying the principles of our invention in its normal state. Fig. 2 is a view of the same after it has apparently become inverted. Fig. 3 is a vertical sectional view. Figs. 4 and 5 are sectional views showing the mechanism for lifting and reversing the performers. Fig. 6 is a section of the same on the line A—B of Fig. 4. Fig. 7 shows a detail of the same. Fig. 8 shows the mechanism by which the change in the appearance of the ceiling is effected. Fig. 9 shows the construction of one of the trap doors employed. Fig. 10 is a sectional view showing the construction of the side wings. Fig. 11 is a perspective view showing the construction of the floor cloth. Fig. 12 is a side view showing the way any heavy objects or properties are controlled. Fig. 13 illustrates a slight modification of the structure shown in Fig. 8.

Referring to the drawing in which like parts are designated by the same reference sign, 1 designates the floor or stage of a theater. This stage is of the usual construction having a trap door 2 at the center, preferably of the type known as a "vampire trap" as later described.

The scene taken to illustrate the principles of the invention is an interior or room, but it will be evident that the invention is not limited to any particular character of scene.

3 denotes vertical posts or columns which preferably extend in a double series throughout the length of the room. These posts contain the mechanism for raising and reversing the performers.

4 denotes side wings, 5 a back drop, and 6 the ceiling for the scene. There may also be provided a staircase or balcony or similar object 7 for ornament, or preferably for actual use in the performance.

8 designates a floor cloth or rug, and 9 a similar area on the ceiling which normally constitutes a fresco about the chandelier 10.

The construction of the side wings 4 is particularly illustrated in Fig. 10. There is a main sheet or surface 11 and a supplemental sheet or flap 12, hinged or flexibly attached to the middle of the main sheet at 13. Under normal conditions the supplemental sheet or flap is folded up against the top part of the main sheet in which relation it is held by a hook 14. The hook 14 can be released by a cord 15, whereupon the flap drops forwardly as shown by the dotted lines until it rests against the lower half of the main sheet. This causes an entirely new surface to be presented throughout the area of these side wings, and which may be painted to depict a complete inversion of the normal scene, as shown for example in Figs. 1 and 2. The back drop 5 is constructed in all respects similar to the side wings. The floor cloth 8 is also constructed upon this principle as shown in Fig. 11. There is a flap 16 hinged to the middle of the floor cloth and which is capable of being thrown from one side to the other so as to expose a complete new surface. One surface depicts a rug and the other the fresco of a ceiling. At its center this floor cloth is entirely cut away to expose the trap door 2, constructed as shown in Fig. 9. Two leaves or doors 18 are supported on spring hinges 19 so as to swing up or down, but normally remain in the closed position shown. Their meeting edges may be notched slightly at registering points to accommodate the chandelier.

The area 9 on the ceiling is a completely reversible section, as particularly shown in Fig. 8. This section is swiveled on a central axis 20 and has rollers at one side or edge guided in the grooves 21 of a pair of arcuate frames 22 on the upper side of the ceiling 6. 23 is a cord contained in one of said grooves and attached to the reversible ceiling section 9 so as to turn the same over, when desired.

In Fig. 13 a slight modification is shown in which a pulley 24 is fixed to the reversible ceiling section and operated by a cord or band 25. The ceiling section 9 has a trap door 26 in all respects similar to the trap door 2 of the floor.

The means for lifting and reversing the performers is particularly shown in Figs. 4 and 5. The posts 3 are made hollow, with two separate vertical chambers or passages 27 and 28. In the chamber 27 there is loosely contained a carriage 29 which is normally impelled upward by a counterweight 30, movable in the chamber 28, and connected to the carriage 29 by a cord 31 passing over a pulley 32. 33 denotes a latch, adapted to be released by a lever 34, for normally restraining the carriage 29 against upward movement. Within the carriage and projecting outwardly through a vertical slot 35 of the post 3, there is journaled a shaft 36 having a gear section 37 thereon. This shaft has flattened portions 38 by which it is normally restrained in either of two diametrically opposite positions by the springs 39. 40 denotes a frame or harness in which the performer may engage him or herself, and which is rigidly fixed to the projecting end of the shaft 36. There is also provided a rack 41 in the path of the gear or pinion 37 and adapted to impart a movement through half a revolution thereto during the upward or downward movement of the carriage 29. 42 denotes a latch for engaging and holding the carriage 29 at the completion of its upward movement. This latch has a lever 43 by which it is released. The counterweight 30 is made in two separable parts or sections, the lower one 44 of which is normally sustained by a spring or detent 45. At the completion of the upward movement of the carriage 29, this spring or detent 45 impinges against a cam or wedge surface 46 and is laterally displaced so as to release the lower section 44 of the counterweight. The carriage and performer are however prevented from falling on account of this lessened counterweight by the latch 42.

The use and operation will be clear from the foregoing description. Normally the parts are in the relation shown in Fig. 1 and the performers enter and execute any dance or figures which may be desired. Finally they position themselves against the posts 3 and adjust themselves in their frames or harnesses 40. At a given signal the lights go out and each performer depresses the latch 33 of her apparatus and is lifted to the ceiling by the counterweight 30. In this position she is retained head downward on account of the reversal of her frame or harness by the rack 41 and pinion 37. The lower section 44 of the counterweight is detached as above described at this time but the carriage and performer is prevented from coming down, until she desires, by the latch 42. In the meantime the flaps of the side wings, the back drop and the floor cloth have been reversed so as to expose their alternate and properly painted surfaces. The ceiling section 9 is also reversed, the chandelier 10 having first been drawn upward through the trap door 26. A similar chandelier 26' in the meantime is thrust upward through the trap door 2 and the floor cloth. These chandeliers are preferably constructed with an equatorially grooved body in which the lamps are contained, so that the chandeliers may be thrust hastily through their trap doors without danger of breaking the lamps. It is evident that when these various changes have been made, that the complete scene, including all the performers, will appear to have been reversed in toto, the change being entirely effected in a very few seconds. Any heavy or solid properties such as the stairway or balcony of Fig. 12 may be made in two separable sections and drawn away to the sides by an endless cord or band 50 running over windlasses 51 and having its separate strands connected to the respective parts of the stairway or property. The two parts are brought together again by a reverse movement of the windlasses. An imitation property 52, similar in appearance to that removed, may be hinged to the ceiling at 53, and dropped down during the change of scene to strictly maintain the appearance of a perfect reversal throughout. The back drop 5 is located far enough to the rear, in practice, to permit this movement. Finally at a second signal the performers depress the upper latches 42, and all the parts and scenes are returned to their original conditions, in this way apparently effecting a second complete reversal of the scene.

What we claim, is:—

1. A means for producing a scenic illusion, comprising side wings having flexibly connected flaps, a back drop, having a flexibly connected flap and a floor cloth also having a flexibly connected flap the said flaps having reversed duplicate designs whereby when the flaps are turned over the structure of which they form a part will appear to be inverted.

2. A means for producing a scenic illusion, comprising side wings having flexibly connected flaps, a floor and ceiling, the said flaps and the floor and ceiling having duplicate reversed designs and means for exposing one or the other design whereby the parts appear to become inverted.

3. A means for producing a scenic illusion, comprising side wings, a floor cloth having a flexibly connected flap, and a ceiling having a reversible section of an area corresponding to the floor cloth the ceiling and the floor cloth having duplicate reversed designs whereby upon reversing the parts they appear to have exchanged places.

4. A means for producing a scenic illusion, comprising a stage having a central trap door and a floor cloth with a flexibly connected flap, and a ceiling having a reversible section with a central trap door, and a pair of similar chandeliers adapted to be thrust through said trap doors.

5. A means for producing a scenic illusion, comprising a stage having a floor cloth, a ceiling having a pivoted reversible section, and correspondingly located trap doors in said stage and in said ceiling section.

6. A means for producing a scenic illusion, comprising side wings and a back drop each having flexibly connected flaps with duplicate reversed designs, windlasses connected by an endless cord or band, and a property or object in separable sections respectively connected to the strands of said cord or band.

7. In an apparatus of the class described, a vertically movable carriage, a shaft having a frame or harness, and journaled in said carriage, and means for automatically turning said shaft through half a revolution when said carriage ascends or descends.

8. In an apparatus of the class described, a vertically movable carriage, a frame or harness supported thereby, a counterweight connected to said carriage, and means for disconnecting a section of said counterweight when said carriage has ascended to its upper limit of movement.

9. In an apparatus of the class described, a vertically movable carriage, means for supporting a performer thereon, a counterweight connected to the carriage a latch having a lever depressible by the performer for normally restraining the carriage against upward movement, and a similar latch at the upper limit of movement of the carriage for preventing its return, except at the will of the performer.

10. A means for producing a scenic illusion comprising side wings having flaps with duplicated reversed designs whereby upon lowering the flaps the wings will appear to have been inverted.

11. A means for producing a scenic illusion comprising a floor cloth and a ceiling section having duplicate reversed designs, and means to vary the exposure of the design and thereby effect an apparent exchange of location of the floor cloth and the ceiling section.

12. A means for producing a scenic illusion comprising a floor cloth and a ceiling section having duplicate reversed designs, a pair of similar chandeliers adapted to be exposed through the ceiling section and the floor cloth, means for varying the designs exposed by the floor cloth and the ceiling section, and means for exposing one or the other chandelier according to the design exposed.

Signed at New York, in the county of New York and State of New York.

CHARLES F. DE SORIA.
JOHN F. CORRIGAN.

Witnesses:
JAMES D. ANTONIE,
WALDO M. CHAPIN